United States Patent
Kojima et al.

(10) Patent No.: US 7,145,261 B2
(45) Date of Patent: Dec. 5, 2006

(54) ELECTRIC GENERATOR CONTROL METHOD AND APPARATUS, AND VEHICLE EQUIPPED WITH SUCH APPARATUS

(75) Inventors: Hiroyuki Kojima, Wako (JP); Takashi Ozeki, Wako (JP); Yoshiaki Tsukada, Wako (JP); Hiroaki Uchisasai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/199,789

(22) Filed: Aug. 9, 2005

(65) Prior Publication Data

US 2006/0033337 A1 Feb. 16, 2006

(30) Foreign Application Priority Data

Aug. 10, 2004 (JP) .............................. 2004-233113

(51) Int. Cl.
*B60K 6/00* (2006.01)
(52) U.S. Cl. .................... 290/40 C; 290/40 F
(58) Field of Classification Search ...................... None
See application file for complete search history.

(56) References Cited

U.S. PATENT DOCUMENTS

| | | | | |
|---|---|---|---|---|
| 3,305,723 A | * | 2/1967 | Maine et al. ............. | 290/40 R |
| 3,701,556 A | * | 10/1972 | Richmond ................ | 290/40 B |
| 5,886,416 A | * | 3/1999 | Arai ......................... | 290/40 C |
| 6,054,844 A | * | 4/2000 | Frank ........................ | 322/16 |
| 6,441,506 B1 | * | 8/2002 | Nakashima ............... | 290/40 C |
| 6,740,986 B1 | * | 5/2004 | Shimizu et al. ........... | 290/40 C |
| 6,836,027 B1 | * | 12/2004 | Lee ........................... | 290/40 C |

FOREIGN PATENT DOCUMENTS

| | | | |
|---|---|---|---|
| EP | 698521 A1 | * | 2/1996 |
| JP | 2000142157 A | * | 5/2000 |
| JP | 2000-253597 | | 9/2000 |

\* cited by examiner

*Primary Examiner*—Joseph Waks
(74) *Attorney, Agent, or Firm*—Carrier, Blackman & Associates, P.C.; Joseph P. Carrier; William D. Blackman (57) ABSTRACT

A vehicle having an electric generator control apparatus is provided for gradually reducing an engine load imposed due to electricity generation while a throttle valve is in the process of becoming fully open, thereby increasing a vehicle acceleration capability. The electric generator control apparatus is incorporated in a vehicle which has an ACG starter motor for generating electric power from power of an engine and supplying the generated electric power to a battery and other electric loads. When an engine throttle opening exceeds a preset value, the electric generator control apparatus continuously gradually reduces the amount of electric power generated by the ACG starter motor depending on the throttle opening in a fully opening direction which exceeds the preset value. The load imposed on the engine by electricity generation is gradually reduced, resulting in a corresponding increase in the acceleration capability of the vehicle.

17 Claims, 6 Drawing Sheets

7: CONTROL UNIT
20: ENGINE
21a: MOTOR GENERATOR
21b: ELECTRIC MOTOR
23: CONTINUOUSLY VARIABLE TRANSMISSION
40: CENTRIFUGAL CLUTCH
44: ONE-WAY CLUTCH
54b: FAN
69: SPEED REDUCER MECHANISM
74: BATTERY
85: THROTTLE GRIP
WR: REAR WHEEL

BASIC DEMANDED AMOUNT OF ELECTRIC POWER

FIG. 6A

DEMANDED AMOUNT OF ELECTRIC POWER TO BE CHARGED TO THE BATTERY

FIG. 6B

CORRECTING COEFFICIENT FOR
DEMANDED AMOUNT OF ELECTRIC POWER

FIG. 6C

DEMANDED AMOUNT OF ELECTRIC POWER

FIG. 6D

ELECTRIC GENERATOR CONTROL METHOD AND APPARATUS, AND VEHICLE EQUIPPED WITH SUCH APPARATUS

CROSS-REFERENCE TO RELATED APPLICATIONS

The present invention claims priority under 35 USC 119 based on Japanese patent application No. 2004-233113, filed on Aug. 10, 2004. The subject matter of this priority document is incorporated by reference herein.

BACKGROUND OF THE INVENTION

1. Field of the Invention

The present invention relates to a control method and apparatus for an electric generator provided for generating electric power from engine power in a vehicle. The present invention also relates to a vehicle equipped with an apparatus of the type described.

2. Description of the Background Art

Vehicles, such as saddle-type vehicles, including two-wheeled vehicles, are commonly provided with an electric generator, for generating electric power from engine power. The electric generator serves to supply electric power to operate accessories of the vehicle, including a battery, lights, etc. The generator normally generates electric power depending on the speed and rotary power output of the engine. Since the electric generator generates electric power by consuming the rotary power of the engine, if the generated electric power is large, then the ability of the engine to drive a wheel is correspondingly reduced. Specifically, when the throttle valve is fully opened to accelerate the vehicle at a maximum rate, if the electric generator generates a large amount of electric power, then engine power output and peak engine power are reduced correspondingly. The negative effect of the increase in the generated electric power on the engine power output is greater on vehicles carrying engines having smaller power output capabilities.

Heretofore, Japanese laid-Open Patent document No. 2000-253597 disclosed one proposed solution to the above problems, in which an electric generator control apparatus temporarily reduces a battery charging voltage produced by an electric generator upon quick acceleration of the vehicle, thereby lowering the load on the engine during such acceleration.

When the vehicle is driven normally, the proposed electric generator control apparatus of the reference charges the battery at a battery charging voltage of 14.5 V. When the throttle is detected, by various sensors, as being quickly and fully opened, the proposed electric generator control apparatus of the reference charges the battery at a battery charging voltage of 12.0 V, which is lower than when the vehicle is driven normally. Therefore, on the vehicle carrying the proposed electric generator control apparatus, when the throttle is fully open, the power consumption due to the charging of the battery is reduced, resulting in a corresponding increase in the accelerating capability of the engine.

According to the conventional electric generator control apparatus of the reference, however, since the battery charging voltage switches from 14.5 V to 12.0 V when the throttle opening reaches a nearly fully opened value, the vehicle acceleration capability cannot be increased unless the throttle opening is brought to the nearly fully opened value. Consequently, driving conditions capable of accomplishing the benefits of the increased vehicle acceleration capability are limited.

It is therefore an object of the present invention to provide an electric generator control apparatus for gradually reducing an engine load imposed on the engine due to electricity generation, while a throttle valve is in the process of becoming fully open, thereby increasing a vehicle acceleration capability, and also to provide a vehicle carrying such an electric generator control apparatus.

SUMMARY OF THE INVENTION

In order to achieve the above object, a first aspect of an invention provides an electric generator control apparatus (for example, an electric generator control apparatus 88 in an embodiment described later) for controlling the amount of electric power generated by an electric generator in a vehicle, which has an engine (e.g., an engine 20 in the embodiment described later), whose power output for driving a wheel is adjustable by moving a throttle valve. The vehicle is provided with an the electric generator (e.g., an ACG starter motor 21$a$ in the embodiment described later) for generating electric power from rotary engine power, and for supplying the electric power to an electric load (e.g., a battery 74 and an electric load 92 in the embodiment described later). When a throttle opening exceeds a preset value, the amount of electric power generated by the electric generator is reduced, depending on how far the throttle valve is opened beyond the preset value, in a fully opening direction.

According to the first aspect of the invention, when the throttle opening exceeds the preset value, the amount of electric power generated by the electric generator is reduced, depending on the extent that the throttle valve is opened. Therefore, the engine load due to electricity generation is gradually reduced, while the throttle valve is in the process of opening fully.

According to a second aspect of the invention, in the invention described above, when the throttle opening exceeds the preset value, the amount of electric power generated by the electric generator is continuously gradually reduced depending on an increase in the throttle opening beyond the preset value in the fully opening direction. In this arrangement, when the throttle opening increases beyond the preset value, the engine load due to electricity generation is continuously gradually reduced, depending on the increase in the throttle opening.

According to a third aspect of the invention, in the invention described above, the amount of electric power generated by the electric generator is gradually reduced depending on the amount of throttle opening beyond the preset value, so that the amount of electric power generated by the electric generator is substantially zero when the throttle valve is substantially fully opened. In this arrangement, since the load due to operation of the electric generator can be further reduced, the acceleration capability of the vehicle can be further increased.

According to a fourth aspect of the invention, in the invention found in any one of the first through fourth aspects thereof, after the throttle valve is substantially fully opened, and the amount of electric power generated by the electric generator has been reduced for a predetermined period of time, the amount of electric power generated by the electric generator is subsequently increased, even if the throttle valve remains substantially fully opened. In this arrangement, if the amount of electric power generated by the electric generator is reduced for the predetermined period of time, then the vehicle can be accelerated during that time. Since the amount of electric power generated by the electric generator is increased only after the predetermined period of time has passed, any adverse effects on the electric load such as a battery or the like are minimized.

According to a fifth aspect of the invention, a vehicle is provided, including an engine whose power output for driving a wheel is adjustable by a throttle valve. The vehicle according to the fifth aspect hereof also includes an electric generator for generating electric power from rotary engine power, an electric motor for applying drive power to the wheel, and a battery for being charged with the electric power generated by the electric generator and supplying electric power to the electric motor. The vehicle according to the fifth aspect hereof also includes an electric generator control apparatus for controlling the amount of electric power generated by the electric generator. When a throttle opening exceeds a preset value, the electric generator control apparatus reduces the amount of electric power generated by the electric generator, depending on the extent of throttle valve opening beyond the preset value.

According to the invention, when the throttle opening exceeds the preset value, the engine load due to electricity generation is gradually reduced while the throttle valve is in the process of becoming fully opened. When the battery is charged with electric power from the electric generator in a cruise charging mode while the vehicle is cruising at a constant speed only with power from the engine, if the throttle opening is equal to or greater than the preset value, the amount of electric power generated by the electric generator is gradually reduced, depending on the increase in the throttle opening.

According to the first aspect of the invention, since the engine load due to electricity generation is gradually reduced while the throttle valve is in the process of becoming fully open, the acceleration capability of the vehicle can be further increased.

According to the second aspect of the invention, when the throttle opening further increases in excess of the preset value, the engine load due to electricity generation is gradually reduced continuously depending on the increase in the throttle opening. Therefore, the vehicle is able to have a smooth acceleration capability depending on the increase in the throttle opening.

According to the third aspect of the invention, inasmuch as the load due to electricity generation by the electric generator can be further reduced, the acceleration capability of the vehicle can be further increased.

According to the fourth aspect of the invention, because the amount of electric power generated by the electric generator is reduced only during a predetermined period of time in an initial acceleration stage, any adverse effect posed on the electric load such as a battery or the like by an electric power shortage is minimized.

According to the fifth aspect of the invention, the acceleration capability of the vehicle can be increased, and, in particular, the acceleration capability from the cruise charging mode, wherein no assistive forces from the electric motor are applied, can reliably be increased.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

A selected illustrative embodiment of the present invention will be described below, with reference to the drawings. In the following description, relative terms such as front, rear, right and left refer to those directions considered from the vantage point of a driver seated on the vehicle and facing forward.

Figure 1:
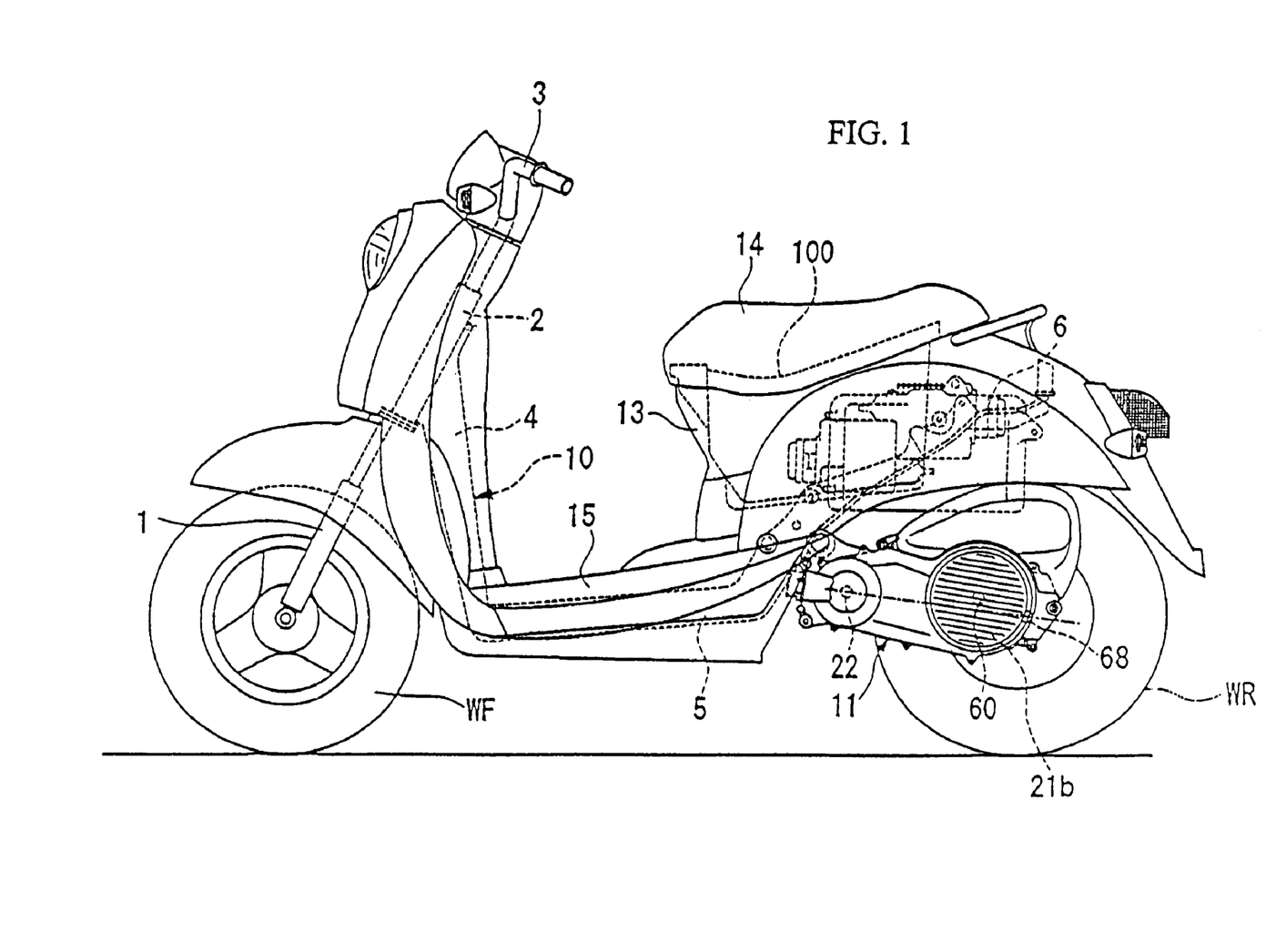
FIG. 1 is a side elevational view of a hybrid scooter according to an illustrative embodiment of the present invention, showing a power unit mounted to the rear wheel.

An example of a vehicle according to the selected illustrative embodiment is a hybrid scooter, which is an example of a saddle-type vehicle. As shown in FIG. 1, the vehicle has a power unit 11 including an electric motor 21b and is supported, together with a rear wheel WR, as a swingable unit which is pivotally mounted on a vehicle frame 10.

The vehicle has a front fork 1 on which a front wheel WF is supported by a shaft forwardly of a vehicle body. The front fork 1 is pivotally supported on a head pipe 2 of the vehicle frame 10. The front fork 1 has an upper end coupled to a handlebar 3 which can be operated to steer the vehicle. A down pipe 4 is mounted on and extends rearwardly and downwardly from the head pipe 2. An intermediate frame 5 extends substantially horizontally from the lower end of the down pipe 4. A rear frame 6 extends rearwardly and upwardly from the rear end of the intermediate frame 5. The vehicle frame 10 includes the head pipe 2, the down pipe 4, the intermediate frame 5, and the rear frame 6, as main components thereof.

The vehicle frame 10 is covered with a cover assembly 13. A seat 14 for the rider to be seated thereon is fixed to a substantially central upward protrusion of the cover assembly 13. The cover assembly 13 includes a step floor 15, for supporting the feet of a rider thereon, and which is disposed forwardly of and below the seat 14. The cover assembly 13 also includes a storage box 100, functioning as a utility space for storing a helmet, a cargo, etc., and this storage box is disposed below the seat 14.

A general arrangement of the power unit 11 will be described below, with reference to FIG. 2. The power unit 11 includes an engine 20, which is an internal combustion engine, an alternating current generator (ACG) starter motor 21a, and a continuously variable transmission 23. The power unit 11 also includes a centrifugal clutch 40, a one-way clutch 44, a speed reducer mechanism 69, and an electric motor 21b. The engine 20 functions as a first power source. The ACG starter motor 21a, which corresponds to the electric generator according to the invention, functions as an engine starter for starting the engine 20, and also functions as an electric generator.

The continuously variable transmission 23 transmits power of the engine 20 at a speed reduction ratio, which depends on the engine operating speed, to the rear wheel WR as a drive wheel. The centrifugal clutch 40 is disposed between the engine 20 and the continuously variable transmission 23, for selectively transmitting power therebetween. The one-way clutch 44 transmits power from the continuously variable transmission 23 to the rear wheel WR, but prevents power from being transmitted from the rear wheel WR to the continuously variable transmission 23. The speed reducer mechanism 69 is disposed between an output member (driven shaft 60) of the one-way clutch 44, which is on the side of the rear wheel WR, and an axle 68 of the rear wheel WR, for transmitting power output at a speed reduction ratio to the rear wheel WR. The electric motor 21b optionally functions as a second power source, as needed, and also functions as an electric generator when the engine 20 is operating.

The power unit 11 basically has two drive systems. One drive system transmits power from the engine 20 through the centrifugal clutch 40, the continuously variable transmission 23, the one-way clutch 44, the driven shaft 60, and the speed reducer mechanism 69 to the rear wheel WR. The other drive system transmits power of the electric motor 21b through the driven shaft 60 and the speed reducer mechanism 69 to the rear wheel WR.

A battery 74, which corresponds to an electric load according to the present invention, is connected to the ACG starter motor 21a and the electric motor 21b. When the motors 21a, 21b function as an engine starter and an electric motor, respectively, the battery 74 supplies electric power to these motors. When the motors 21a, 21b, respectively, function as engine generators, the battery 74 is charged with regenerated electric power from these motors 21a, 21b. The ACG motor 21a is also electrically connected to other electric loads 92 such as lights or the like, in addition to the battery 74. In the vehicle according to the depicted embodiment, the electric motor 21b is energized mainly by electric power generated by the ACG starter motor 21a when the vehicle starts to move.

An electronic control unit 7 controls the engine 20, the ACG starter motor 21a, the electric motor 21b, etc., according to a control program contained therein.

The engine 20 is arranged to introduce an air-fuel mixture including air and fuel from an intake pipe 16, and combusts the introduced air-fuel mixture. The intake pipe 16 houses a throttle valve 17 angularly movably disposed therein for controlling the rate of intake air flowing through the intake pipe 16. The throttle valve 17 is moved angularly within the intake pipe 16, depending on the movement of a throttle grip 85 that is operated by the rider of the vehicle. Between the throttle valve 17 and the engine 20, there are disposed an injector 18 for injecting fuel and a negative pressure sensor 19 for detecting a negative pressure in the intake pipe 16. The angular position of the throttle valve 17 is readable by a throttle position sensor 90 (FIG. 5) attached thereto, which is in electronic communication with the electronic control unit 7.

Figure 3:
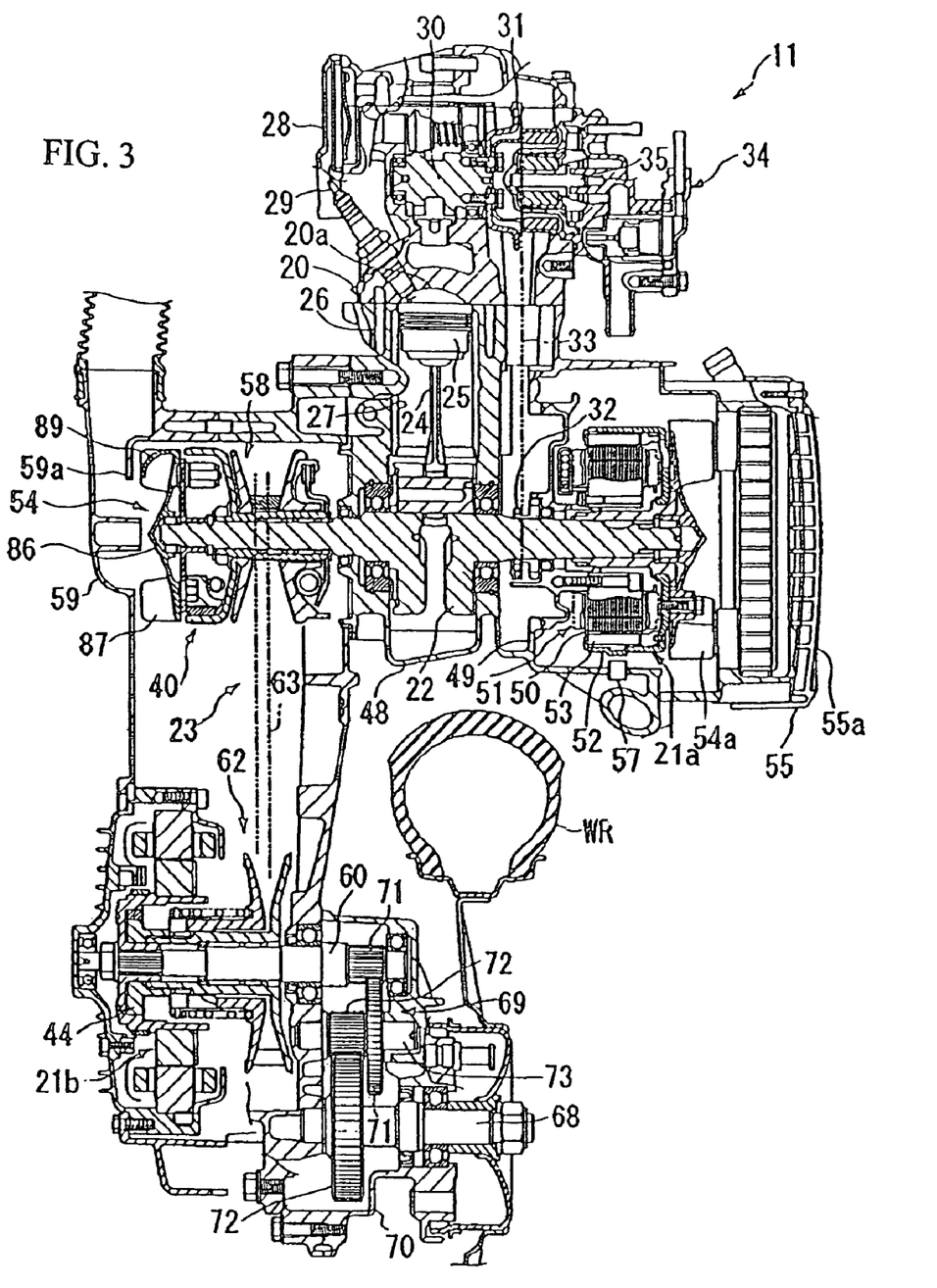
FIG. 3 is a cross-sectional view of the power unit of the vehicle of FIG. 1, showing the ACG starter motor mounted to the crankshaft of the engine.

Structural details of the power unit 11 will be described below with reference to FIG. 3.

The engine 20 has a piston 25 slidably and reciprocally disposed in a cylinder 27. The cylinder 27 is disposed in a cylinder block 26. The piston 25 is operatively coupled to the crankshaft 22 by a connecting rod 24. The cylinder block 26 is arranged such that the cylinder 27 has a substantially horizontal axis. A cylinder head 28 is fixed to a head of the cylinder block 26 to close one end of the cylinder 27. The cylinder head 28 and the piston 25 jointly define a combustion chamber 20a therebetween, for combusting an air-fuel mixture therein.

Valves (not shown) for controlling the intake of an air-fuel mixture into, and the discharge of exhaust gases from the combustion chamber 20a, are mounted in the cylinder head 28, along with a spark plug 29. The valves are opened and closed by the rotation of a camshaft 30 which is rotatably supported in the cylinder head 28. The camshaft 30 has a driven sprocket 31 mounted on an end thereof, and an endless cam chain 33 is entrained around the driven sprocket 31. A drive sprocket 32 is mounted on an end of the crankshaft 22. The camshaft 30 is ganged to the rotation of the crankshaft 22 by the cam chain 33. A water pump 34 for cooling the engine 20 is also operatively connected to an end of the camshaft 30.

The water pump 34 has a rotatable shaft 35 attached thereto for concurrent rotation with the camshaft 30. Therefore, the water pump 34 operates when the camshaft 30 rotates.

A stator case 49 is coupled to a transverse right side of a crankcase 48 by which the crankshaft 22 is rotatably supported, and houses the ACG starter motor 21a therein. The ACG starter motor 21a is a so-called outer-rotor motor and has a stator including a coil 51 in the form of a conductive wire wound around teeth 50 fixed to the stator case 49. An outer rotor 52 is fixed to the crankshaft 22 and has a substantially cylindrical shape covering the stator. Magnets 53 are fixed to the inner circumferential surface of the outer rotor 52.

A centrifugal fan 54a for cooling the ACG starter motor 21a is mounted on the outer rotor 52. When the centrifugal fan 54a rotates together with the crankshaft 22, external air is introduced from a cooling air inlet defined in a side wall 55a of a cover 55 of the stator case 49.

The continuously variable transmission 23 has a drive transmission pulley 58 mounted on the left end portion of the crankshaft 22 that projects transversely from the crankcase 48 with the centrifugal clutch 40 interposed therebetween.

The continuously variable transmission 23 also has a driven transmission pulley 62 mounted on the driven shaft 60 parallel to the crankshaft 22 with the one-way clutch 44 interposed therebetween, and an endless V-belt 63 for transmitting rotational power from the drive transmission pulley 58 to the driven transmission pulley 62.

Figure 4:
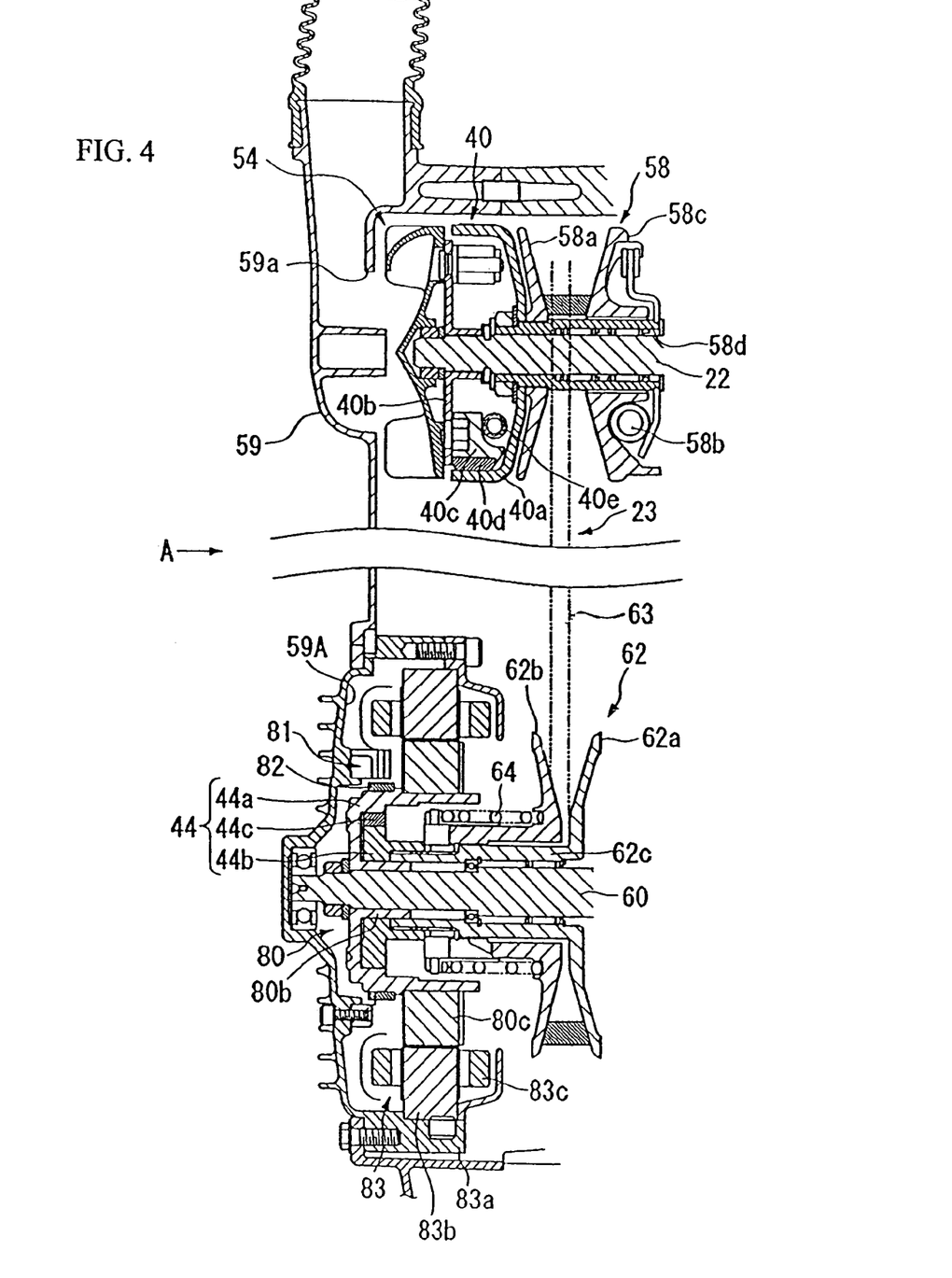
FIG. 4 is an enlarged fragmentary view of the power unit of FIG. 3, detailing the continuously variable transmission, the centrifugal clutch, and the one-way clutch.

As shown at an enlarged scale in FIG. 4, the drive transmission pulley 58 is mounted rotatably on the crankshaft 22 with a sleeve 58d interposed therebetween. The drive transmission pulley 58 includes a fixed drive pulley member 58a fixedly mounted on the sleeve 58d and a movable drive pulley member 58c axially slidably, but circumferentially nonrotatably, mounted on the sleeve 58d. A weight roller 58b for displacing the movable drive pulley member 58c toward the fixed drive pulley member 58a under centrifugal forces is mounted on the movable drive pulley member 58c.

The driven transmission pulley 62 includes a fixed driven pulley member 62a mounted axially nonslidably, but circumferentially rotatably, on the driven shaft 60, and a movable driven pulley member 62b mounted axially slidably on a boss 62c of the fixed driven pulley member 62a. A spring 64 for normally biasing the movable driven pulley member 62b toward the fixed driven pulley member 62a is disposed behind the movable driven pulley member 62b, i.e., on the transverse left side of the movable driven pulley member 62b.

The endless V-belt 63 is trained around belt grooves of substantially V-shaped cross section which are defined between the fixed drive pulley member 58a and the movable drive pulley member 58c and between the fixed driven pulley member 62a and the movable driven pulley member 62b.

When the rotational speed of the crankshaft 22 increases, the weight roller 58b of the drive transmission pulley 58 is subjected to a centrifugal force, causing the movable drive pulley member 58c to slide toward the fixed drive pulley member 58a. Then, the movable drive pulley member 58c moves toward the fixed drive pulley member 58a, reducing the width of the groove of the drive transmission pulley 58. The position where the drive transmission pulley 58 and the V-belt 63 contact each other is shifted radially outwardly, increasing the radius of the circle around which the V-belt 63 is trained. Accordingly, the width of the groove defined between the fixed driven pulley member 62a and the movable driven pulley member 62b of the driven transmission pulley 62 is increased. Thus, depending on the rotational speed of the crankshaft 22, the radius of the circle around which the V-belt 63 is trained, i.e., the transmission pitch circle diameter, changes continuously, causing the speed reduction ratio to change automatically and continuously.

The centrifugal clutch 40 is disposed on the transverse left end of the crankshaft 22 which extends through the fixed drive pulley member 58a of the continuously variable transmission 23. The centrifugal clutch 40 includes a cup-shaped outer case 40a fixedly mounted on the sleeve 58d, an inner plate 40b fixed to the left end of the crankshaft 22 which extends through the outer case 40a, a shoe 40d mounted on an outer circumferential surface of the inner plate 40b within the outer case 40a by a weight 40c and facing radially outwardly, and a spring 40e for biasing the shoe 40d radially inwardly. In the present embodiment, the inner plate 40b, the weight 40c, and the shoe 40d serve as an inner rotor of the centrifugal clutch 40, and the outer case 40a as an outer rotor. The centrifugal fan 54 is mounted on an outer end surface of the inner plate 40b of the centrifugal clutch 40 for passing external air introduced from a cooling air inlet 59a of a transmission case 59 into the transmission case 59 according to a blowing action of the centrifugal fan 54.

The centrifugal clutch 40 thus constructed selectively transmits power based on a balance between the centrifugal force of the weight 40c and the biasing force of the spring 40e. When the rotational speed of the crankshaft 22 is equal to or lower than a predetermined value, e.g., 3000 rpm, the centrifugal clutch 40 transmits no power under the bias of the spring 40e. As the rotational speed of the crankshaft 22 exceeds the predetermined value, the centrifugal force acting on the weight 40c counteracts the bias of the spring 40e, causing the weight 40c to move radially outwardly, whereupon the shoe 40d presses the inner circumferential surface of the outer case 40a. At this time, the shoe 40d and the outer case 40a frictionally slide against each other, gradually transmitting power therebetween. As a result, the rotation of the crankshaft 22 is transmitted through the centrifugal clutch 40 to the sleeve 58d, driving the drive transmission pulley 58 fixed to the sleeve 58d.

The one-way clutch 44 includes a cup-shaped outer clutch member 44a, an inner clutch member 44b inserted coaxially in the outer clutch member 44a, and a roller 44c for transmission power unidirectionally from the inner clutch member 44b to the outer clutch member 44a. The outer clutch member 44a doubles as the inner rotor body of the electric motor 21b and is constructed as a member identical to the inner rotor body. The inner circumferential surface of the inner clutch member 44b and the left end of the boss 62c of the fixed driven pulley member 62a are splined to each other.

Power from the engine 20, which is transmitted to the driven transmission pulley 62 of the continuously variable transmission 23, is transmitted through the driven shaft 60 and the speed reducer mechanism 69 to the rear wheel WR. Conversely, power input from the rear wheel WR through the speed reducer mechanism 69 and the driven shaft 60 is not transmitted to the continuously variable transmission 23. Therefore, when the vehicle is pushed by the rider or is in a regenerative mode, power from the rear wheel WR only causes the outer clutch member 44a to idle with respect to the inner clutch member 44b, but is not transmitted to the continuously variable transmission 23 and the engine 20.

The speed reducer mechanism 69 has an intermediate shaft 73 rotatably supported parallel to the driven shaft 60 and the axle 68 of the rear wheel WR, a pair of first speed reducer gears 71 mounted respectively on a right end portion of the driven shaft 60 and a central portion of the intermediate shaft 73, and a pair of second speed reducer gears 72 mounted respectively on a left end portion of the intermediate shaft 73 and a left end portion of the axle 68. The rotation of the driven shaft 60 is transmitted at a predetermined speed reduction ratio to the axle 68 of the rear wheel WR which is rotatably supported parallel to the driven shaft 60.

The electric motor 21b includes an inner-rotor-type motor with the driven shaft 60 serving as a motor output shaft. The outer clutch member 44a serves as an inner rotor body of an inner rotor 80. The electric motor 21b has a stator 83 fixed by a stator case 83a to an inner surface of the transmission case 59 which covers sides of the centrifugal clutch 40 and the continuously variable transmission 23. The stator 83 has teeth 83b around which a coil 83c is wound.

The outer clutch member 44a is of a cup shape and has a central boss 80b splined to the driven shaft 60. Magnets 80c are mounted on an outer circumferential surface of the outer clutch member 44a near the open end thereof. A plurality of detectable elements 82 for being detected by a rotor sensor 81 mounted on an inner wall surface 59A of the transmission case 59 are mounted on an outer circumferential surface of the outer clutch member 44a near the bottom end thereof.

Figure 2:
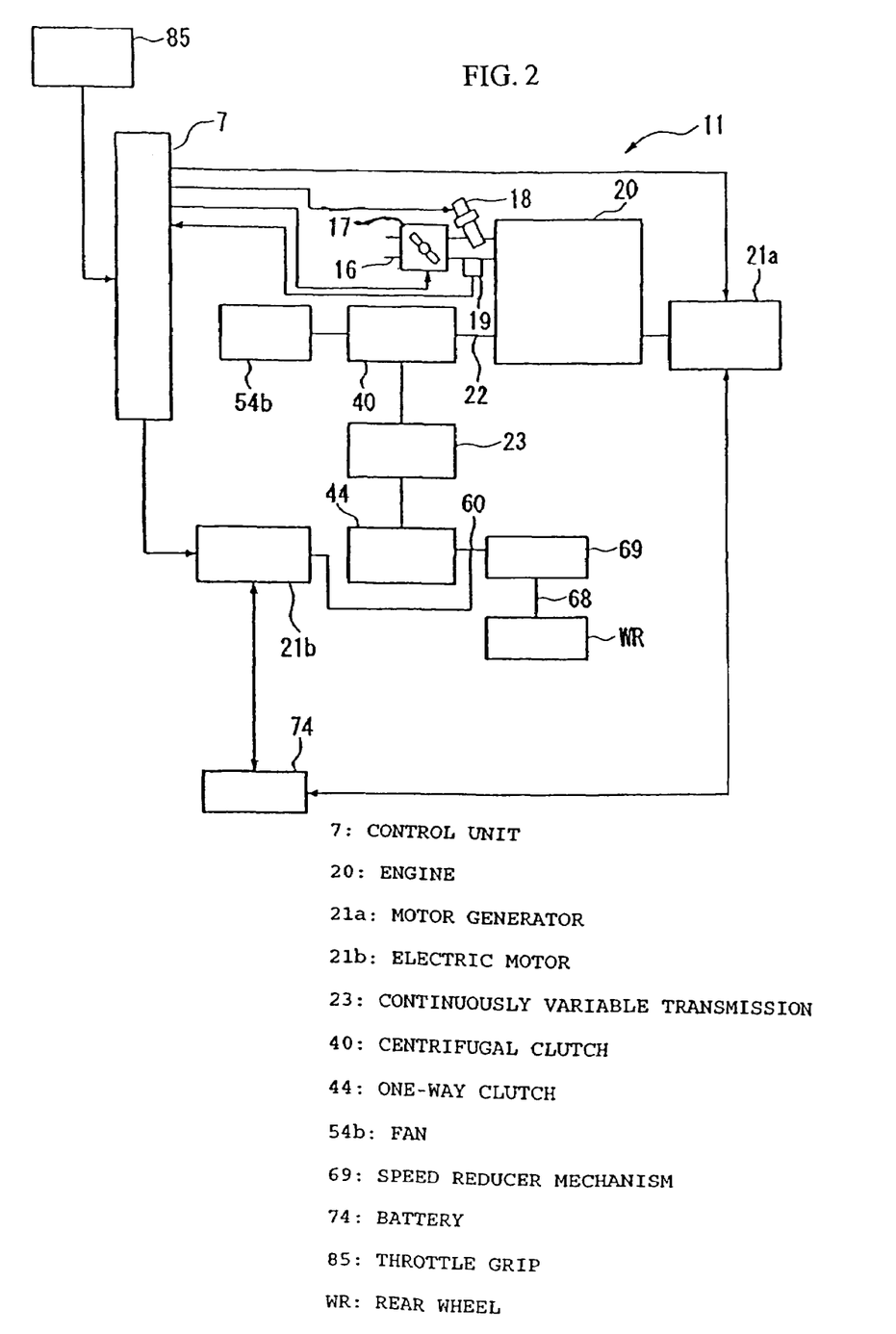
FIG. 2 is a schematic block diagram of the power unit arrangement of the vehicle of FIG. 1, showing the control unit controlling an ACG starter motor.

The electric motor 21b thus constructed functions as an electric generator for starting the vehicle, assists in the power output of the engine 20, and also functions as a generator when operated in the regenerative mode, for converting the rotation of the driven shaft 60 into electric energy to charge the battery 74 (shown in FIG. 2).

Figure 5:
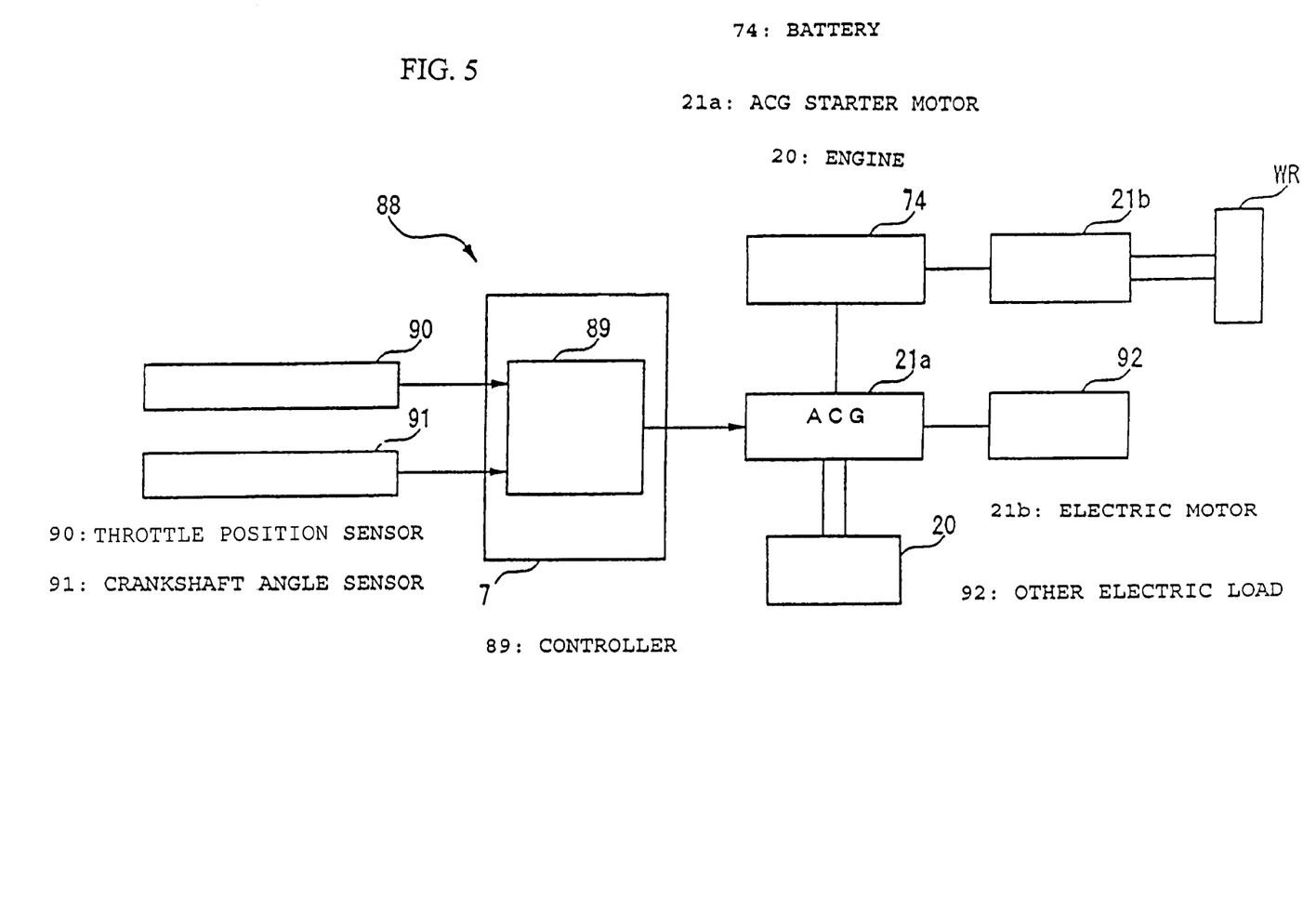
FIG. 5 is a schematic block diagram of a electric generator controller and related components of the vehicle of FIG. 1.

As shown in FIG. 5, the electric generator control apparatus 88 according to the present invention has a controller 89 disposed in the control unit 7 (see FIG. 2) for controlling the amount of electric power generated by the ACG starter motor 21a, which serves as a generator. The electric generator control apparatus also includes a throttle position sensor 90 for detecting the amount of opening of the throttle valve 17 (see FIG. 2), and a crankshaft angle sensor 91 for detecting the rotary engine speed. The controller 89 basically determines an amount of electric power to be generated by the ACG starter motor 21a, i.e., a demanded amount of electric power, based on the rotary engine speed detected by the crankshaft angle sensor 91. In the electric generator control apparatus 88, the controller 89 corrects the amount of electric power to be generated by the ACG starter motor 21a based on the rotary engine speed, in view of the throttle position and speed of opening (accelerator movement).

Figure 6A:
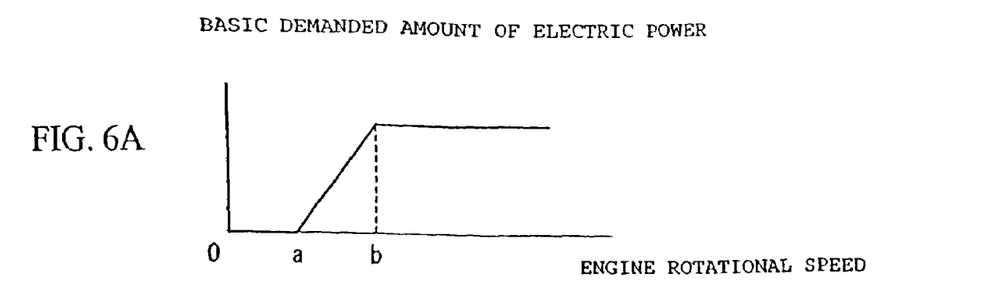
FIG. 6(A) is a graph of basic demanded amount of electric power (exclusive of the amount of electric power to be charged into the battery) versus rotary engine speed.
Figure 6B:
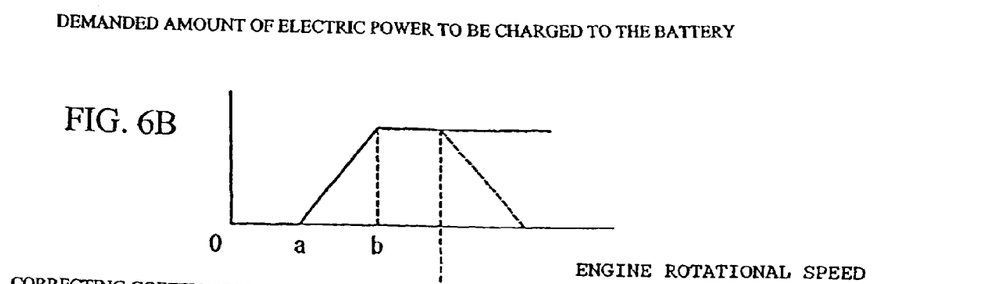
FIG. 6(B) is a graph of demanded amount of electrical power to be charged into the battery versus rotary engine speed.

Specifically, in a first step, the controller 89 calculates a basic demanded amount of electric power, exclusive of an amount of electric power to be charged into the battery 74, as shown in FIG. 6(A). In a second step, the controller 89 calculates a demanded amount of electric power to be charged into the battery 74, as shown in FIG. 6(B). Each of the basic demanded amount of electric power and the demanded amount of electric power to be charged to the battery increases from a certain engine speed "a" in proportion to an increase in the rotary engine speed, and becomes constant at a certain rotary engine speed value "b" or higher.

Figure 6C:
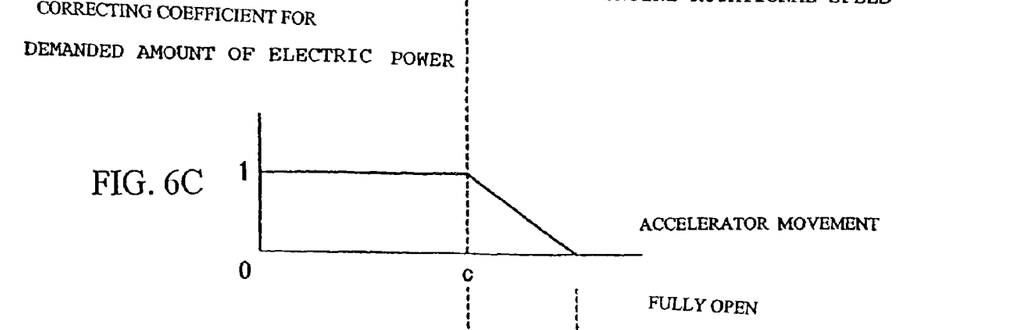
FIG. 6(C) is a map showing values of a correction coefficient for a demanded amount of electric power against acceleration movement (amount of throttle opening)

In a third step, the controller 89 calculates a correction coefficient for the demanded amount of electric power to be charged, in view of the throttle opening (accelerator movement), or reads such a corrective coefficient from a map, as shown in FIG. 6(C). The correction coefficient is set to a value of "1" as long as the throttle opening (accelerator movement) is less than a predetermined value "c", and is gradually reduced toward "0" in proportion to an increase in the throttle opening (accelerator movement). Thereafter, in a fourth step, the controller 89 adds the mathematical product of the demanded amount of electric power to be charged and the correction coefficient to the basic demanded amount of electric power, thus determining a final demanded amount of electric power (see FIG. 6(D)) according to the equation (1) shown below, and controls the amount of electric power generated by the ACG starter motor 21a so as to be equal to the final demanded amount of electric power.

Demanded amount of electric power=basic demanded amount of electric power+(correction coefficient×demanded amount of electric power to be charged) (1)

When the throttle opening exceeds the preset value "c" before it becomes fully opened, the electric generator control apparatus 88 performs a control process for continuously gradually reducing the amount of electric power generated by the ACG starter motor 21a, depending on an incremental increase in the throttle opening, beyond the preset value "c", in a fully opening direction.

Basic operation of the vehicle will be described below. For starting the engine 20, the crankshaft 22 is rotated by the ACG starter motor 21a on the crankshaft 22. At this time, the centrifugal clutch 40 is not engaged, and no power is transmitted from the crankshaft 22 to the continuously variable transmission 23. An air-fuel mixture that is drawn into the cylinder 27 in synchronism with the rotation of the crankshaft 22 is combusted by the spark plug, reciprocally moving the piston 25.

For starting to move the vehicle from this state, the electric motor 21b is energized by the electric power generated by the ACG starter motor 21a or the electric power from the battery 74, and the drive power from the electric motor 21b, depending on the throttle opening controlled by the rider, is transmitted to the rear wheel WR. During this time, the rotational speed of the crankshaft 22 increases depending on the throttle opening. When the rotational speed of the crankshaft 22 exceeds a predetermined value, e.g., 3000 rpm, the rotational power of the crankshaft 22 is transmitted through the centrifugal clutch 40 to the continuously variable transmission 23. When the power of the engine 20 is transmitted from the continuously variable transmission 23 through the one-way clutch 44 to the speed reducer mechanism 69, the rear wheel WR is rotated by the transmitted power. Thereafter, the electric motor 21b is de-energized, and the vehicle is driven by the engine 20.

While the vehicle is being driven by the engine 20, the electric motor 21b is appropriately driven depending on a condition such as the load on the engine 20. When the electric motor 21b is energized, the assistive force from the electric motor 21b is transmitted to the rear wheel WR. While the vehicle is cruising at a constant speed, the electric motor 21b is de-energized and the vehicle is driven by the engine 20 only, and the ACG starter motor 21a charges the battery 74 in the cruise charging mode. The ACG starter motor 21a charges the battery 74 not only in the cruise charging mode, but also appropriately while the vehicle is running.

The foregoing is the basic operation of the vehicle according to the present embodiment. Under certain driving conditions such as quick acceleration, wherein the throttle opening (accelerator movement) exceeds the preset value "c" (see FIG. 6(C)), the vehicle is controlled to operate as follows:

When the throttle opening exceeds the preset value "c" as upon quick acceleration, the controller 89 of the electric generator control apparatus 88 performs the first through fourth steps described above for continuously, gradually and variably reducing the amount of electric power generated by the ACG starter motor 21a, depending on an additional incremental increase in the throttle opening. From the time when the throttle opening exceeds the preset value "c", the power consumption by the engine 20 due to electricity generation is gradually reduced, and the power output of the engine 20 is correspondingly used effectively for driving the rear wheel WR. Therefore, when the throttle opening is increased in excess of the preset value "c", the acceleration capability is gradually increased toward the fully opened throttle. The rider does not perceive a bad driving feel, since the amount of electric power generated by the ACG starter motor 21a (the engine load) is not quickly reduced upon an increase in the throttle opening.

The acceleration capability can be increased in almost all conditions wherein the rear wheel WR is driven by the engine 20. Increasing the acceleration capability is particularly effective in the cruise charging mode in which the travel of the vehicle is not assisted by the electric motor 21b. Specifically, even if the electric motor 21b is de-energized in the cruise charging mode, the electric generator control apparatus 88 reduces the consumption of power by the engine 20, due to electricity generation by the ACG starter motor 21a depending on an increase in the throttle opening, thereby quickly increasing the acceleration capability.

Figure 6D:
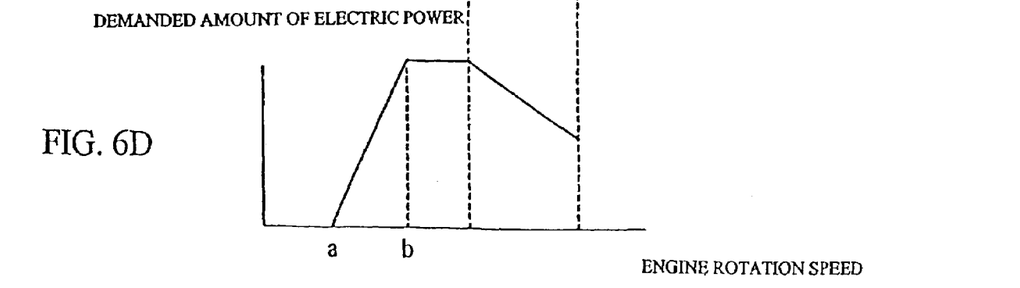
FIG. 6(D) is a graph of a calculated final demanded amount of electric power versus rotary engine speed.

The electric generator control apparatus 88 according to the present embodiment continuously, gradually and variably reduces the amount of generated electric power after the throttle opening has exceeded the preset value "c", so that the amount of generated electric power to be charged into the battery 74 becomes substantially zero when the throttle valve is substantially fully opened. Since the basic demanded amount of electric power consumed not for charging the battery 74 is reliably maintained, as shown in FIGS. 6(A) and 6(D) even when the throttle valve is substantially fully open, there is no danger of unstable supply of electric power to the electric load 92 such as lights, etc. other than the battery 74.

It is also possible for the electric generator control apparatus 88 to continuously gradually reduce the amount of generated electric power after the throttle opening has exceeded the preset value "c" so that the amount of electric power generated by the ACG starter motor 21a, including the amount of generated electric power to be charged into the battery 74, becomes substantially zero when the throttle valve is substantially fully opened. In this case, inasmuch as the load imposed by electricity generation by the ACG starter motor 21a when the throttle valve is substantially fully opened is further reduced, the acceleration capability of the engine 20 can be further increased.

The acceleration capability can sufficiently be increased by reducing the amount of electric power generated by the ACG starter motor 21a continuously for a certain period of time. Therefore, after the amount of electric power generated by the ACG starter motor 21a has been reduced for the certain period of time, the amount of electric power generated by the ACG starter motor 21a may be increased irrespective of the throttle opening. In this case, any adverse effects imposed by an electric power shortage on the electric load such as the battery 74, etc. are reduced as much as possible.

The present invention is not limited to the above embodiment, but various design changes may be made therein without departing from the scope of the invention. For example, according to the above embodiment, when the throttle opening exceeds the preset value "c", the amount of electric power generated by the ACG starter motor 21a is gradually reduced continuously depending on an increase in the throttle opening. However, the amount of electric power generated by the ACG starter motor 21a may be gradually reduced stepwise depending on an increase in the throttle opening.

What is claimed is:

1. In a vehicle of the type having an engine, whose power output is adjustable by varying a position of a throttle valve, and an electric generator for generating electric power from rotary engine power and for supplying the electric power to an electric load, the improvement comprising an electric generator control apparatus for controlling operation of the electric generator;

wherein the electric generator control apparatus is operable to control the amount of electric power generated by the electric generator so as to variably reduce the load applied to the engine by the operation of the electric generator when an amount of opening of the throttle valve exceeds a preset value, depending on the extent that the throttle valve is opened beyond the preset value.

2. The electric generator control apparatus according to claim 1, wherein the apparatus is operable in a manner such that when the amount of throttle opening exceeds the preset value, the amount of electric power generated by the electric generator is continuously gradually reduced, depending on the extent that the throttle valve is opened beyond the preset value.

3. The electric generator control apparatus according to claim 2, wherein the apparatus is operable in a manner such that the amount of electric power generated by the electric generator is substantially zero when the throttle valve is substantially fully opened.

4. The electric generator control apparatus according to claim 3, wherein the apparatus is operable in a manner such that after the throttle valve is substantially fully opened, and the amount of electric power generated by the electric generator has been reduced for a predetermined period of time, the amount of electric power generated by the electric generator is subsequently increased even though the throttle valve remains substantially fully opened.

5. The electric generator control apparatus according to claim 1, wherein the apparatus is operable in a manner such that after the throttle valve is substantially fully opened, and the amount of electric power generated by the electric generator has been reduced for a predetermined period of time, the amount of electric power generated by the electric generator is subsequently increased even though the throttle valve is substantially fully opened.

6. The electric generator control apparatus according to claim 1, wherein the apparatus is operable in a manner such that the electric generator control apparatus reduces the amount of electric power generated by the electric generator, based on a correction coefficient.

7. The electric generator control apparatus according to claim 1, wherein the apparatus is operable in a manner such that the electric generator control apparatus controls the amount of electric power generated by the electric generator so as to be equal to a final demanded amount of electric power, and wherein the final demanded amount of electric power is calculated by determining a product of a correction coefficient and a demanded amount of electric power required to charge the battery, and adding the product to a demanded amount of electric power required to power the vehicle exclusive of the demanded amount of electric power required to charge the battery.

8. A vehicle comprising:
a frame;
a wheel operatively connected to the frame;
an engine operatively attached to the frame for driving the wheel, the engine having a throttle valve and being capable of generating a power output that is adjustable by variably opening the throttle valve;
an electric generator operatively mounted on the frame for generating electric power from the engine power output;
an electric motor operatively connected to said wheel for applying a drive power thereto;
a battery for being charged by the electric generator and for supplying electric power to said electric motor; and
an electric generator control apparatus for controlling the operation of said electric generator;
wherein said electric generator control apparatus is operable to variably reduce the amount of electric power generated by the electric generator when the throttle valve is opened beyond a preset value, depending on the extent to which the throttle valve is opened beyond the preset value.

9. The vehicle according to claim 8, wherein said electric generator control apparatus is operable in a manner such that when the throttle valve is opened beyond the preset value, the amount of electric power generated by the electric generator is continuously gradually reduced depending on the extent to which the throttle valve is opened beyond the preset value.

10. The vehicle according to claim 9, wherein said electric generator control apparatus is operable in a manner such that the amount of electric power generated by the electric generator is substantially zero when the throttle valve is substantially fully opened.

11. The vehicle according to claim 8, wherein said electric generator control apparatus is operable in a manner such that after the throttle valve is substantially fully opened and the amount of electric power generated by the electric generator has been reduced for a predetermined period of time, the amount of electric power generated by the electric generator is increased even though the throttle valve is substantially fully opened.

12. A method of controlling operation of an electric generator in a vehicle having an engine with adjustable power output and an electrical power generator, wherein operation of said electrical power generator applies a load to said engine, said method comprising the steps of:
   variably controlling the power output of the engine by varying the position of a throttle valve;
   sensing a position of said throttle valve with a throttle position sensor;
   monitoring output of said throttle position sensor with an electronic control unit;
   controlling the amount of electric power generated by the electric power generator so as to variably reduce the load applied to the engine by the operation of the electric power generator, depending on the extent that the throttle valve is opened beyond a preset value.

13. The method of claim 12, wherein when the throttle position exceeds the preset value, the amount of electric power generated by the electric generator is continuously gradually reduced, depending on the extent that the throttle valve is opened beyond the preset value.

14. The method of claim 12, wherein the amount of electric power generated by the electric generator is substantially zero when the throttle valve is substantially fully opened.

15. The method of claim 12, wherein after the throttle valve is substantially fully opened, and the amount of electric power generated by the electric generator has been reduced for a predetermined period of time, the amount of electric power generated by the electric generator is subsequently increased even though the throttle valve remains substantially fully opened.

16. The method of claim 12, wherein the electric generator control apparatus reduces the amount of electric power generated by the electric generator, based on a correction coefficient.

17. The method of claim 12, wherein the electric generator control apparatus reduces the amount of electric power generated by the electric generator so at to be equal to a final demanded amount of electric power, wherein the final demanded amount of electric power is calculated by determining a product of a correction coefficient and a demanded amount of electric power required to charge the battery, and adding the product to a demanded amount of electric power required to power the vehicle exclusive of the demanded amount of electric power required to charge the battery.

* * * * *